United States Patent
Zhao et al.

(10) Patent No.: US 11,867,037 B2
(45) Date of Patent: Jan. 9, 2024

(54) EXPERIMENTAL METHOD AND APPARATUS FOR CO₂ DISPLACEMENT PROCESS OF ULTRA-LOW PERMEABILITY OIL RESERVOIR

(71) Applicant: ZHEJIANG OCEAN UNIVERSITY, Zhoushan (CN)

(72) Inventors: Dongfeng Zhao, Zhoushan (CN); Dandan Yin, Zhoushan (CN); Yanhong Zhao, Zhoushan (CN); Yupeng Xu, Zhoushan (CN); Zhenyu Zhu, Zhoushan (CN); Hongyu Zhang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 108 days.

(21) Appl. No.: 17/542,544

(22) Filed: Dec. 6, 2021

(65) Prior Publication Data

US 2022/0186594 A1 Jun. 16, 2022

Related U.S. Application Data (63) Continuation of application No. PCT/CN2021/124861, filed on Oct. 20, 2021.

(30) Foreign Application Priority Data

Dec. 14, 2020 (CN) .......................... 202011465100.3

(51) Int. Cl.
*E21B 43/16* (2006.01)
*E21B 41/00* (2006.01)
*E21B 43/20* (2006.01)

(52) U.S. Cl.
CPC ................................ *E21B 43/164* (2013.01)

(58) Field of Classification Search
CPC ........ E21B 43/16; E21B 43/164; E21B 43/26; E21B 43/168; E21B 43/20; E21B 43/166; E21B 43/2605; E21B 41/0064
See application file for complete search history.

(56) References Cited

U.S. PATENT DOCUMENTS

| 9,932,808 B2 | 4/2018 | Sheng |
| 10,144,864 B1 | 12/2018 | Piri et al. |
| 10,870,794 B2 | 12/2020 | Holcomb et al. |

OTHER PUBLICATIONS

Translation of CN 205135580. (Year: 2016).*

* cited by examiner

*Primary Examiner* — Zakiya W Bates
(74) *Attorney, Agent, or Firm* — True Shepherd LLC; Andrew C. Cheng (57) ABSTRACT

An experimental apparatus used for displacement of $CO_2$ within the reservoir comprises a displacement container and a core holder. The displacement container comprises a water container, an oil container and a gas container. The core holder is respectively connected with the water container, the oil container and the gas container through a connecting pipe; and the core holder connects with a gas-liquid separator through the connecting pipe.

9 Claims, 12 Drawing Sheets

EXPERIMENTAL METHOD AND APPARATUS FOR CO$_2$ DISPLACEMENT PROCESS OF ULTRA-LOW PERMEABILITY OIL RESERVOIR

CROSS-REFERENCE TO RELATED APPLICATIONS

This application is a continuation of International Patent Application No. PCT/CN2021/124861 with a filing date of Oct. 20, 2021, designating the United States, now pending, and further claims priority to Chinese Patent Application No. 202011465100.3 with a filing date of Dec. 14, 2020. The content of the aforementioned applications, including any intervening amendments thereto, are incorporated herein by reference.

TECHNICAL FIELD

The invention relates to the technical field of oil reservoir exploitation, and particularly relates to experimental method and apparatus for CO$_2$ displacement process of ultra-low permeability oil reservoir.

BACKGROUND

The description of this section merely provides background information related to the present application. The background information does not constitute prior art.

The ultra-low permeability oil layer is compact in lithology and high in heterogeneity, which leads to further improvement of single well yield and recovery difficulty by water injection development only. Most of the ultra-low permeability oil reservoirs belong to stress-sensitive reservoirs, and as the injected water enters or the formation fluid is produced, the effective coating pressure of the stratum rock will change, and the rock is deformed, thereby causing the formation porosity and permeability change. Therefore, it is necessary to further explore the feasibility and reasonable injection mode of the ultra-low permeability oil reservoir CO$_2$ to improve the single well yield and recovery rate. However, the prior art lacks an experimental method and apparatus for studying the CO$_2$ displacement process of the ultra-low permeability oil reservoir.

It should be noted that the above description of the technical background is only for a clear and complete explanation of the technical solutions of the present application, and it is convenient for those skilled in the art to understand. The above technical solutions are not considered to be known to those skilled in the art only because these solutions are set forth in the background section of the present application.

SUMMARY OF THE INVENTION

The purpose of the present invention is to provide an experimental method and apparatus for a CO$_2$ displacement process of an ultra-low permeability oil reservoir. By designing the experimental apparatus, the problem of deviation of experimental results caused by reduction of the accuracy of experimental apparatuses is solved, and under the condition of ensuring the accuracy of the experiment, a relatively reasonable injection mode is obtained through the designed experimental method, and the recovery efficiency is improved.

The technical solutions adopted by the present invention are as follows:

An experimental apparatus for a CO$_2$ displacement process of an ultra-low permeability oil reservoir, A displacement container, the displacement container comprising a water container, an oil container and a gas container; a core holder is respectively connected with the water container, the oil container and the gas container through a connecting pipe; and the core holder connects with a gas-liquid separator through the connecting pipe; the core holder comprises a sealing sleeve sleeved outside the core; the core is columnar and the two opposite sides of the core are respectively provided with a first plug and a second plug; the ends of the first plug and the second plug with the core are located in the sealing sleeve; the external of the first plug and the second plug are sealingly sleeved with a cylindrical clamping body; the outer diameter of the first plug is matched with the inner wall of the clamping body; the outer side of the second plug is sleeved with a stop ring coaxial with the outer side of the second plug, and the outer wall of the stop ring is matched with the inner wall of the clamp body; two openings of the clamping body are respectively provided with a first end cover and a second end cover for sealing; an outer wall of the sealing sleeve, the inner wall of the clamping body, a side wall of the stop ring and a side wall of the first plug form a confining pressure cavity; a pressure source connector is provided on the clamping body and in the middle of the confining pressure cavity; both ends of the confining pressure cavity are respectively provided with a differential pressure joint; the clamping body is externally provided with a differential pressure meter, and the differential pressure meter is connected to the differential pressure joint.

The experimental apparatus designed in the present application respectively provides an oil container, a water container, and a gas container to facilitate displacement experiments or hybrid displacement experiments using different media. The present application provides a plurality of experimental paths to facilitate exploring an optimized displacement method to improve harvesting and filtering, and is provided with a gas-liquid separator for separating products obtained by displacement and respectively measuring recovery, which can ensure accurate experimental results. In the process of researching the CO$_2$ displacement process of the ultra-low permeability oil reservoir, the situation that the experimental data parameter deviation is finally obtained due to the defect of the core holder can exist. When the deviation data is large, it is easy to find, but it is difficult to find it when the data deviation is small, which results in a reduction in the accuracy of the experimental data. Therefore, the core holder in the experimental device is improved, and the problem that the experimental data deviation is difficult to find due to the fact that the core holder defect is small is solved.

Specifically, the sealing sleeve is used for coating the side wall of the tested core, and under the action of external pressure, the inner wall of the sealing sleeve and the side wall of the core are completely sealed and attached, so that the problem of inaccurate experimental data caused by the fact that the medium flows out of the gap between the core and the inner wall of the sealing sleeve is avoided; and meanwhile, the first plug and the second plug and the core contact ends are arranged in the sealing sleeve. In this way, the problem of contact sealing between the first plug and the second plug is solved, and the side wall of the first plug and the side wall of the second plug can be sealed under the action of external pressure to prevent the medium from flowing out, thereby ensuring the accuracy of experimental data. In the process of injecting external air pressure or hydraulic pressure into the confining pressure chamber, there may be situations in which the pressure at the two ends of the confining pressure chamber is inconsistent, which results in inconsistent tightness of the sealing sleeve and the core. The differential pressure joint and the differential pressure gauge are used to monitor the pressure at both ends of the confining pressure chamber to solve the problem of inconsistent confining pressure caused by inconsistent pressure of the two ends. The first end cover and the second end cover are used for sealing the two openings of the clamping body, so as to prevent the medium from flowing out, and ensure that the medium flows from the set path.

According to an embodiment of the present invention, the first plug is provided with a first hole penetrating the two ends of the first plug; an anti-corrosion pad is provided between an end of the first plug and the end of the core; the first hole penetrates through the anti-corrosion pad and the first plug; the second plug is provided with a second hole penetrating the two ends of the second plug; the anti-corrosion pad is provided between an end of the second plug and the end of the core; the second hole penetrates through the anti-corrosion pad and the second plug. A sealing ring is respectively arranged on the first plug and the second plug which are covered by the sealing sleeve. The part of second plug which disposed outside the second end cover is provided with a connecting ring.

The first hole is provided for injecting a medium to the core. Another hole may also be provided on the first plug for air return, etc., and can be set according to test requirements. The anti-corrosion pad provided at the contact end of the first plug and the core is made of an anti-corrosion material, and aims to isolate or reduce the corrosion effect of the injection medium in the core on the first plug, so as to solve the problem of sealing failure caused by the long-time test that the contact part is corroded and has a reduced service life or a surface defect. The purpose of the anti-corrosion pad on the second plug is same as the purpose of the anti-corrosion pad on the first plug while the purpose of the second hole provided on the second plug is to discharge the core medium to facilitate metering.

According to an embodiment of the present invention, a first anti-movement component is sleeved on the first plug under the first end cover; the first anti-movement component comprises an anti-movement sleeve sleeved on the outer side of the first plug; anti-movement supporting strips are arranged around the surface of the anti-movement sleeve; the anti-movement supporting strips are connected to the inner wall of the clamping body. There is a large pressure during the experiment, and there may be a loosening or displacement possibility of the plugs on the two sides, which is not conducive to experimental sealing and data accuracy. The stop ring can prevent the second plug from generating displacement; the first anti-movement component prevents the first plug from generating a displacement; and the anti-movement sleeve is sleeved with the outer wall of the first plug; a part of the first plug located inside the clamping body is fixed to the clamping body by anti-movement supporting strips which abuts with the inner wall of the clamp, so as to avoid or reduce the displacement of the first plug under the action of pressure, and the coaxiality between the first plug and the clamping body can be corrected and guaranteed by surrounding the arranged anti-movement supporting strips and the anti-moving sleeves, so that the contact surface between the first plug and the inner wall of the clamping body can be prevented from occurring in the coaxiality deviation, and meanwhile, the first hole formed in the middle of the first plug corresponds to the center position of the core.

According to an embodiment of the present invention, an inclined surface is provided on the first plug next to the first anti-movement component; a first ring groove is arranged around the-surface of the first plug connected with the inner wall of the clamping body; a second sealing ring is provided in the first annular groove; a sealing auxiliary member is provided in a space formed by the first annular groove and an inner wall surface of the clamping body; the sealing auxiliary members extend into the first plug, and the sealing auxiliary members in the first plug are connected to each other; the sealing auxiliary members are sealing strips. In the clamping process of the core, in order to sufficiently ensure the tightness of the core and avoid excessive clamping of the core, the inclined surface is designed on the first plug. When the excessive clamping force is faced, the inclined surface of the first plug can appropriately disperse the clamping force, so that the clamping force applied to the core is uniformly distributed, and stress concentration is avoided; and the sealing auxiliary members arranged inside the first plug can absorb part of the clamping force to avoid the problem that the clamping force is too large. The purpose of providing the first annular groove and the second sealing ring on the inner wall of the first plug and the inner wall of the clamping body is to avoid the problem that the sealing degree between the first plug and the inner wall of the clamping body is insufficient when the first plug is eccentric or assembled. The second sealing ring provided in the middle of the first annular groove can be in contact with the first plug and the clamping body to form three contact surfaces, even if one of the contact surfaces fails, there is still other contact surfaces to ensure sealing contact, thereby ensuring the required sealing requirements of the experiment.

According to an embodiment of the present invention, the sealing sleeve is provided with sealed cavities arranged at intervals; sealing supporting strips are arranged in the sealing cavity; the upper end and the lower end of the sealing supporting strips are respectively connected with the upper end wall and the lower end wall of the sealing cavity; an concave arc-shaped pressure bearing groove is arranged on the outer side of the sealing sleeve; a bent first bearing pressing strip is arranged in the sealing sleeve; the bending parts of the first bearing pressing strip are connected with second bearing pressing strips. The purpose of the sealing sleeve of the present invention is to solve the problem that the sealing sleeve is broken and the contact hole exists between the sealing sleeve and the contact surface of the core. The pressure bearing groove provided on the surface of the sealing sleeve can expand the acting area, thereby improving the effect of the external pressure on the sealing sleeve. The spacer sealing cavities in the sealing sleeve can solve the problem that the sealing sleeve is broken due to excessive confining pressure, and some sealing cavities can be fractured when the confining pressure is too large to avoid the whole fracture of the sealing sleeve. Sealing supporting strips arranged in the sealing cavity can improve the pressure bearing effect, and the sealing cavities arranged at intervals can enable the external confining pressure to be uniformly distributed in the sealing cavities before transmitted to the sealing sleeve on the inner side, so that the inner wall of the sealing sleeve is tightly connected with the surface of the core. This design makes the pressure equalization of both ends of the core and ensures that the pressure difference between the confining pressure and the inlet section of the core is stable, thereby preventing the core pore structure from changing due to excessive pressure difference. In the process of the pressure acting on the sealing sleeve, the first pressure bearing pressing strip can improve the overall strength of the sealing sleeve to reduce the possibility of cracking, and meanwhile, the pressure can drive the second pressure bearing pressing strip to press down to improve the contact tightness between the inner wall of the sealing sleeve and the side wall of the core, thereby eliminating possible gaps.

According to an embodiment of the present invention, the gas-liquid separator comprises a cylindrical first separation substrate; the bottom end of the first separation substrate is connected with a cone-shaped second separation substrate; the bottom of the second separation substrate is connected with a liquid collecting tank; the upper part of the first separation substrate is provided with a gas-liquid exhaust pipe, and the gas-liquid exhaust pipe is connected with a gas meter. The medium from the core discharge end is subjected to gas-liquid separation by means of the gas-liquid separator. There may be a subsequent separation operation of the water-oil substances that may be present in the liquid. According to the present invention, the purpose of designing the cylindrical first separation substrate is to enable the discharge medium to move along the inner wall of the first separation substrate, and the gas-liquid is separated by using centrifugal force and gravity; and the liquid is thrown out to the inner wall of the first separation substrate under the action of gravity and centrifugal force. The second separation substrate plays an aggregation effect on the separated liquid, and increases the downward flowing speed, thereby avoiding the influence of the liquid on the gas-liquid separation process. The gas-liquid exhaust pipe and the gas meter are used for metering the acquired gas so as to obtain experimental data.

According to an embodiment of the present invention, the inner wall of the first separation substrate is provided with separation cavities protruding outwards around the inner wall of the first separation substrate; space among the separation cavities of the inner wall of the first separation substrate is spirally provided with flow guide plates. Designing the flow guide plate on the inner wall of the first separation substrate can promote the spiral rise of the separated gas; and increase the aggregation of the liquid that may be present in the gas flow in the spiral rise, thereby causing the aggregation of droplets in the gas to drop. The separation cavities on the inner wall of the first separation substrate can make it difficult for the liquid obtained by centrifugal separation to flow upward with the upwardly flowing gas after being thrown to the inner wall of the first separation base, thereby increasing the liquid falling rate. When passing through the cavities, even if the gas loses part of the flow rate, the gas can still flow upward under the action of the downward spirally rising gas, thereby expelling the first separation substrate.

According to an embodiment of the present invention, an experimental method for the experimental apparatus for an ultra-low permeability oil reservoir $CO_2$ displacement process, comprising the following steps:

Blow-drying the core, vacuuming the core and measuring the pore volume of the core;
Displacing the formation water with white oil such that the water in the core is in a bound state; displacing the white oil with the formulated formation crude oil; the formation crude oil is saturated when the oil-gas ratio of core effluent is consistent with the oil-gas ratio of formulated formation crude oil;

Performing $CO_2$ flooding after water flooding, direct $CO_2$ flooding, and periodic injection of $CO_2$;
Sensitivity evaluation of the plug.

By means of the experimental method, the method can be used for exploring what kind of injection mode can more effectively improve the recovery rate, and the problem that in the prior art, the experimental method for researching the $CO_2$ displacement process of the ultra-low permeability oil reservoir is lacking is solved. In addition, the above experimental method can provide a reference for the preferred and on-site implementation of the actual parameters.

According to an embodiment of the present invention, the bound water saturation is 40.2%, and after the binding water is established, the core pressure rises to the experimental pressure of 17/12 MPa.

According to an embodiment of the present invention, the operation of $CO_2$ displacement after water displacement comprising: water is injected into the core at a speed of 0.3 mL/h; when the water content of the core is up to 98%, and the pressure of the outlet end of the core rises to 17/12 MPa, $CO_2$ is injected into the core at a speed of 0.3 mL/L; the experiment ends when the oil displacement efficiency is not obviously increased;

the operation of direct $CO_2$ displacement comprising: when the pressure at the outlet end of the core is 17/12 MPa, the $CO_2$ is injected into the core at a speed of 0.3 mL/h; the experiment ends when the oil displacement efficiency is not obviously increased;

the operation of periodic injection of $CO_2$ comprising: the pressure of the outlet end of the core is set to 17 MPa; when depletion mining to 7.1 MPa, $CO_2$ is injected to 17 MPa, and then the failure is depletion mined to 7.1 MPa; 5 cycles are performed; and finally, the oil is depletion mined to the normal pressure.

Advantages Effects of Invention

The experimental apparatus designed in the present application respectively provides an oil container, a water container, and a gas container to facilitate displacement experiments or hybrid displacement experiments using different media. The present application provides a plurality of experimental paths to facilitate exploring an optimized displacement method to improve harvesting and filtering, and is provided with a gas-liquid separator for separating products obtained by displacement and respectively measuring recovery, which can ensure accurate experimental results. The core holder in the experimental device is improved, and the problem that the experimental data deviation is difficult to find due to the fact that the core holder defect is small is solved. By means of the experimental method, the method can be used for exploring what kind of injection mode can more effectively improve the recovery rate, and the problem that in the prior art, the experimental method for researching the $CO_2$ displacement process of the ultra-low permeability oil reservoir is lacking is solved. In addition, the above experimental method can provide a reference for the preferred and on-site implementation of the actual parameters.

DESCRIPTION OF THE DRAWINGS

In order that the invention may be understood more easily, three embodiments according to the invention, by way of example, will now be described referring to the drawings.

DETAILED DESCRIPTION OF PREFERRED EMBODIMENTS

Example 1

Figure 1:
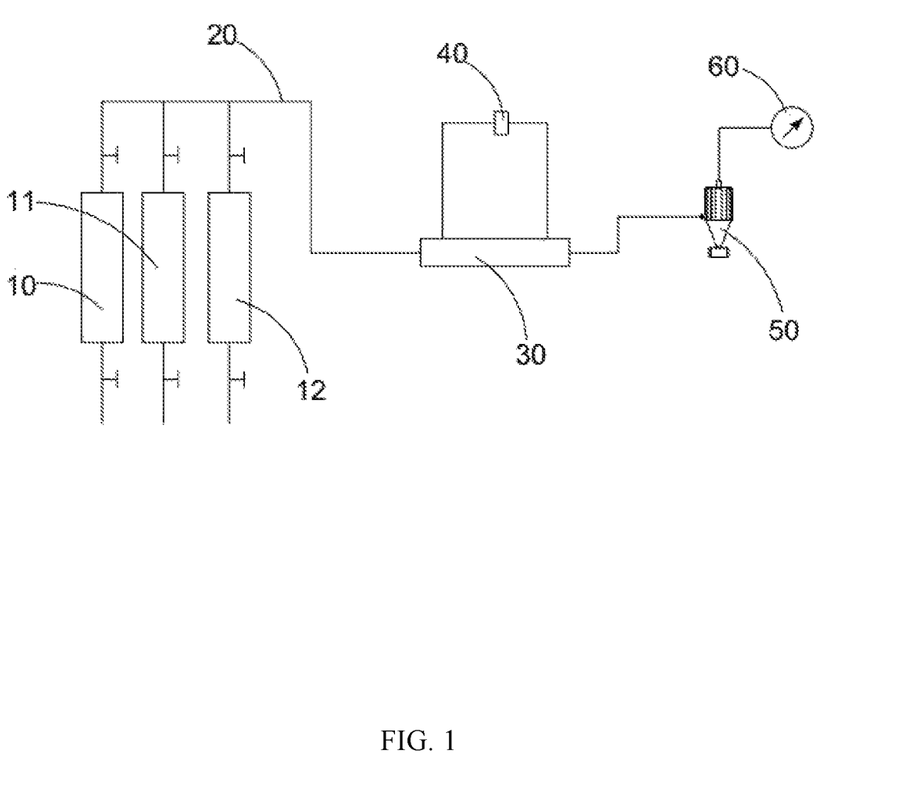
FIG. 1 is a schematic diagram of the experimental apparatus for $CO_2$ flooding process in an ultra-low permeability reservoir.
Figure 2:
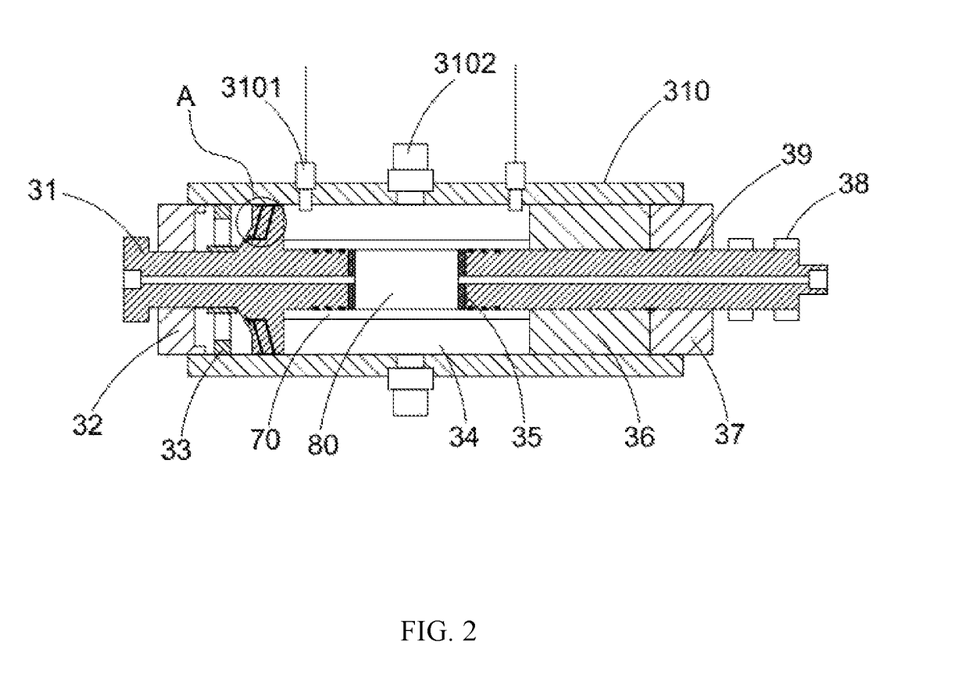
FIG. 2 is a schematic diagram of the inside of the core holder.

Referring to FIG. 1-10, a n experimental apparatus for a $CO_2$ displacement process of an ultra-low permeability oil reservoir, comprising:

A displacement container, the displacement container comprising a water container 10, an oil container 12 and a gas container 11; a core holder 30 is respectively connected with the water container 10, the oil container 12 and the gas container 11 through a connecting pipe 20; and the core holder 30 connects with a gas-liquid separator 50 through the connecting pipe 20; the core holder 30 comprises a sealing sleeve 70 sleeved outside the core 80; the core 80 is columnar and the two opposite sides of the core 80 are respectively provided with a first plug 31 and a second plug 39; the ends of the first plug 31 and the second plug 39 with the core 80 are located in the sealing sleeve 70; the external of the first plug 31 and the second plug 39 are sealingly sleeved with a cylindrical clamping body 310; the outer diameter of the first plug 31 is matched with the inner wall of the clamping body 310; the outer side of the second plug 39 is sleeved with a stop ring 36 coaxial with the outer side of the second plug 39, and the outer wall of the stop ring 36 is matched with the inner wall of the clamp body 310; two openings of the clamping body 310 are respectively provided with a first end cover 32 and a second end cover 37 for sealing; an outer wall of the sealing sleeve 70, the inner wall of the clamping body 310, the side wall of the stop ring 36 and the side wall of the first plug 31 form a confining pressure cavity 34; a pressure source connector 3101 is provided on the clamping body 310 and in the middle of the confining pressure cavity 34; both ends of the confining pressure cavity 34 are respectively provided with a differential pressure joint 3102; the clamping body 310 is externally provided with a differential pressure meter 40, and the differential pressure meter 40 is connected to the differential pressure joint 3102.

The experimental apparatus designed in the present application respectively provides an oil container, a water container, and a gas container to facilitate displacement experiments or hybrid displacement experiments using different media. The present application provides a plurality of experimental paths to facilitate exploring an optimized displacement method to improve harvesting and filtering, and is provided with a gas-liquid separator 50 for separating products obtained by displacement and respectively measuring recovery, which can ensure accurate experimental results. In the process of researching the $CO_2$ displacement process of the ultra-low permeability oil reservoir, the situation that the experimental data parameter deviation is finally obtained due to the defect of the core 80 holder 30 can exist. When the deviation data is large, it is easy to find, but it is difficult to find it when the data deviation is small, which results in a reduction in the accuracy of the experimental data. Therefore, the core 80 holder 30 in the experimental device is improved, and the problem that the experimental data deviation is difficult to find due to the fact that the core 80 holder 30 defect is small is solved.

Specifically, the sealing sleeve 70 is used for coating the side wall of the tested core, and under the action of external pressure, the inner wall of the sealing sleeve 70 and the side wall of the core 80 are completely sealed and attached, so that the problem of inaccurate experimental data caused by the fact that the medium flows out of the gap between the core 80 and the inner wall of the sealing sleeve 70 is avoided; and meanwhile, the first plug 31 and the second plug 39 and the core 80 contact ends are arranged in the sealing sleeve. In this way, the problem of contact sealing between the first plug 31 and the second plug 39 is solved, and the side wall of the first plug 31 and the side wall of the second plug 39 can be sealed under the action of external pressure to prevent the medium from flowing out, thereby ensuring the accuracy of experimental data. In the process of injecting external air pressure or hydraulic pressure into the confining pressure cavity 34, there may be situations in which the pressure at the two ends of the confining pressure cavity 34 is inconsistent, which results in inconsistent tightness of the sealing sleeve 70 and the core. The differential pressure joint 3102 and the differential pressure gauge 40 are used to monitor the pressure at both ends of the confining pressure cavity 34 to solve the problem of inconsistent confining pressure caused by inconsistent pressure of the two ends. The first end cover 32 and the second end cover 37 are used for sealing the two openings of the clamping body 310, so as to prevent the medium from flowing out, and ensure that the medium flows from the set path.

The first plug 31 is provided with a first hole 314 penetrating the two ends of the first plug 31; an anti-corrosion pad 35 is provided between an end of the first plug 31 and the end of the core 80; the first hole 314 penetrates through the anti-corrosion pad 35 and the first plug 31; the second plug 39 is provided with a second hole 391 penetrating the two ends of the second plug 39; the anti-corrosion pad 35 is provided between an end of the second plug 39 and the end of the core 80; the second hole 391 penetrates through the anti-corrosion pad 35 and the second plug 39 A sealing ring is respectively arranged on the first plug and the second plug which are covered by the sealing sleeve. The part of second plug which disposed outside the second end cover is provided with a connecting ring.

The first hole 314 is provided for injecting a medium to the core 80. Another hole may also be provided on the first plug for air return, etc., and can be set according to test requirements. The anti-corrosion pad 35 provided at the contact end of the first plug 31 and the core 80 is made of an anti-corrosion material, and aims to isolate or reduce the corrosion effect of the injection medium in the core 80 on the first plug 31, so as to solve the problem of sealing failure caused by the long-time test that the contact part is corroded and has a reduced service life or a surface defect. The purpose of the anti-corrosion pad 35 on the second plug 39 is same as the purpose of the anti-corrosion pad 35 on the first plug 31 while the purpose of the second hole 391 provided on the second plug 39 is to discharge the core medium to facilitate metering.

Figure 3:
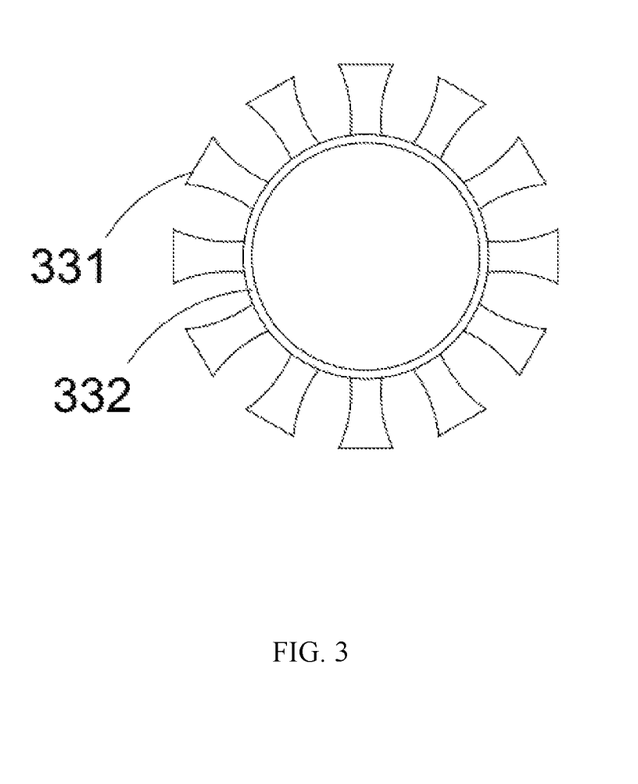
FIG. 3 is a schematic diagram of the first anti-movement component.

A first anti-movement component 33 is sleeved on the first plug 31 under the first end cover 32; the first anti-movement component 33 comprises an anti-movement sleeve 332 sleeved on the outer side of the first plug 31; anti-movement supporting strips 331 are arranged around the surface of the anti-movement sleeve 332; the anti-movement supporting strips 331 are connected to the inner wall of the clamping body 310. There is a large pressure during the experiment, and there may be a loosening or displacement possibility of the plugs on the two sides, which is not conducive to experimental sealing and data accuracy. The stop ring 36 can prevent the second plug 39 from generating displacement; the first anti-movement component 33 prevents the first plug 31 from generating a displacement; and the anti-movement sleeve 332 is sleeved with the outer wall of the first plug 31; a part of the first plug 31 located inside the clamping body 310 is fixed to the clamping body 310 by anti-movement supporting strips 331 which abuts with the inner wall of the clamp, so as to avoid or reduce the displacement of the first plug 31 under the action of pressure, and the coaxiality between the first plug 31 and the clamping body 310 can be corrected and guaranteed by surrounding the arranged anti-movement supporting strips 331 and the anti-moving sleeves 332, so that the contact surface between the first plug 31 and the inner wall of the clamping body 310 can be prevented from occurring in the coaxiality deviation, and meanwhile, the first hole 314 formed in the middle of the first plug 31 corresponds to the center position of the core 80.

Figure 4:
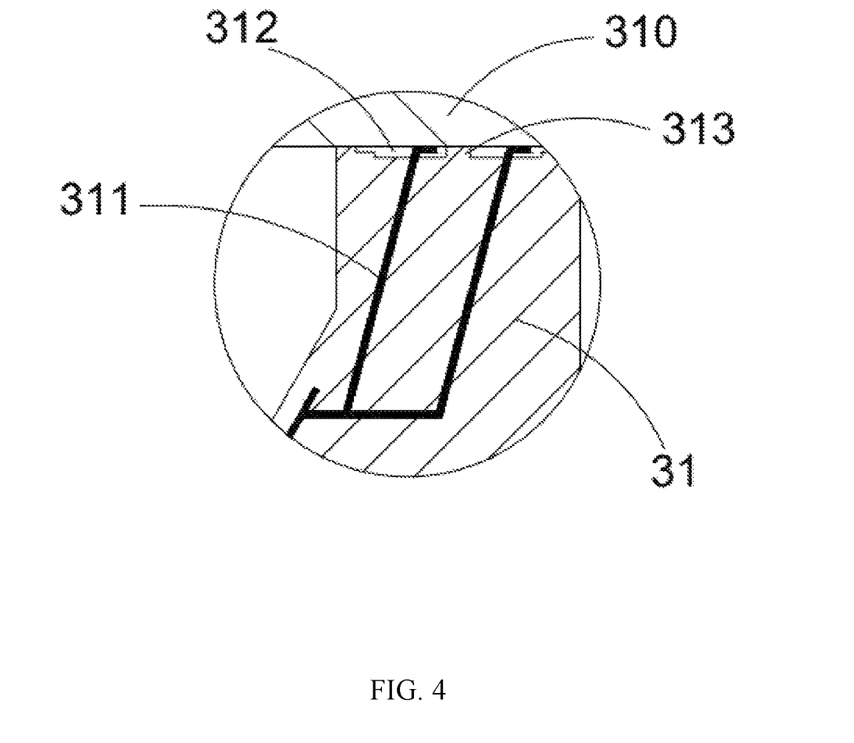
FIG. 4 is an enlarged schematic diagram of part A in FIG. 2.
Figure 5:
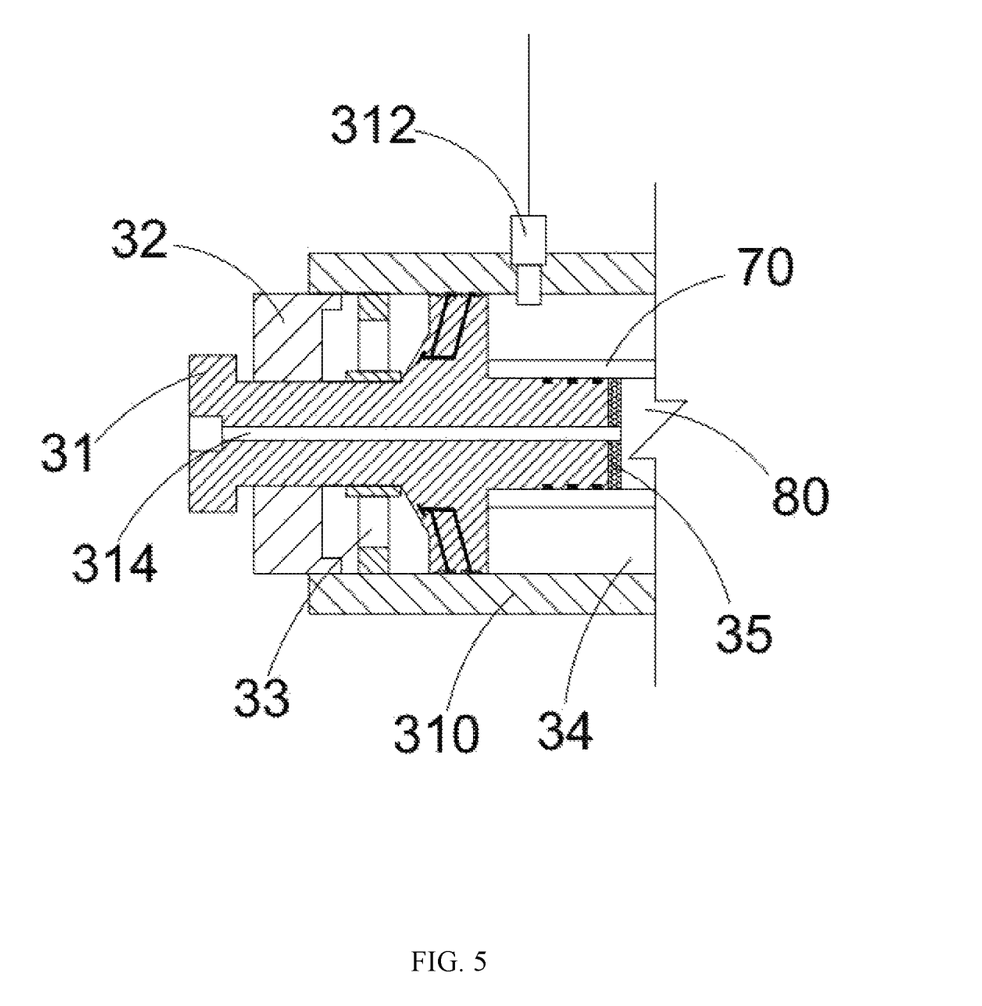
FIG. 5 is a partial schematic diagram of the core holder.
Figure 6:
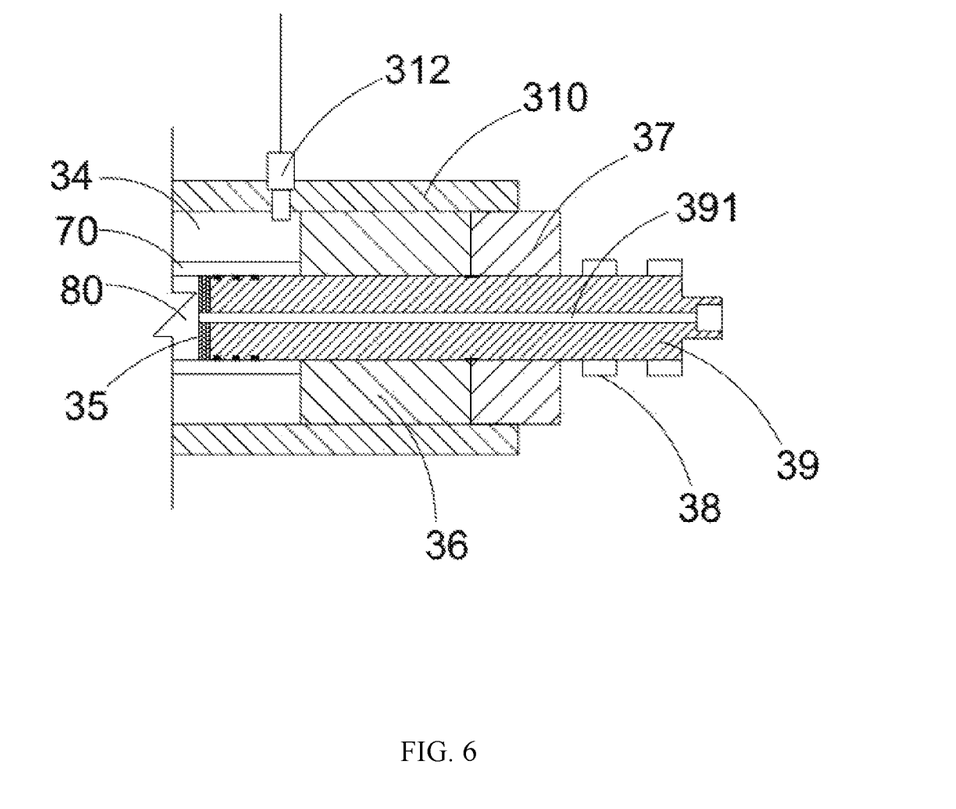
FIG. 6 is another partial schematic diagram of the core holder.

An inclined surface is provided on the first plug 31 next to the first anti-movement component 33; a first ring groove 312 arranged around the-surface of the first plug 31 is connected with the inner wall of the clamping body 310; a second sealing ring 313 is provided in the first annular groove 312; a sealing auxiliary member 311 is provided in a space formed by the first annular groove 312 and an inner wall surface of the clamping body 310; the sealing auxiliary members 311 extend into the first plug 31, and the sealing auxiliary members 311 in the first plug 31 are connected to each other; the sealing auxiliary members 311 are sealing strips. In the clamping process of the core 80, in order to sufficiently ensure the tightness of the core 80 and avoid excessive clamping of the core 80, the inclined surface is designed on the first plug 31. When the excessive clamping force is faced, the inclined surface of the first plug 31 can appropriately disperse the clamping force, so that the clamping force applied to the core 80 is uniformly distributed, and stress concentration is avoided; and the sealing auxiliary members 311 arranged inside the first plug 31 can absorb part of the clamping force to avoid the problem that the clamping force is too large. The purpose of providing the first annular groove 312 and the second sealing ring 313 on the inner wall of the first plug 31 and the inner wall of the clamping body 310 is to avoid the problem that the sealing degree between the first plug 31 and the inner wall of the clamping body 310 is insufficient when the first plug 31 is eccentric or assembled. The second sealing ring 313 provided in the middle of the first annular groove 312 can be in contact with the first plug 31 and the clamping body 310 to form three contact surfaces, even if one of the contact surfaces fails, there is still other contact surfaces to ensure sealing contact, thereby ensuring the required sealing requirements of the experiment.

Figure 7:
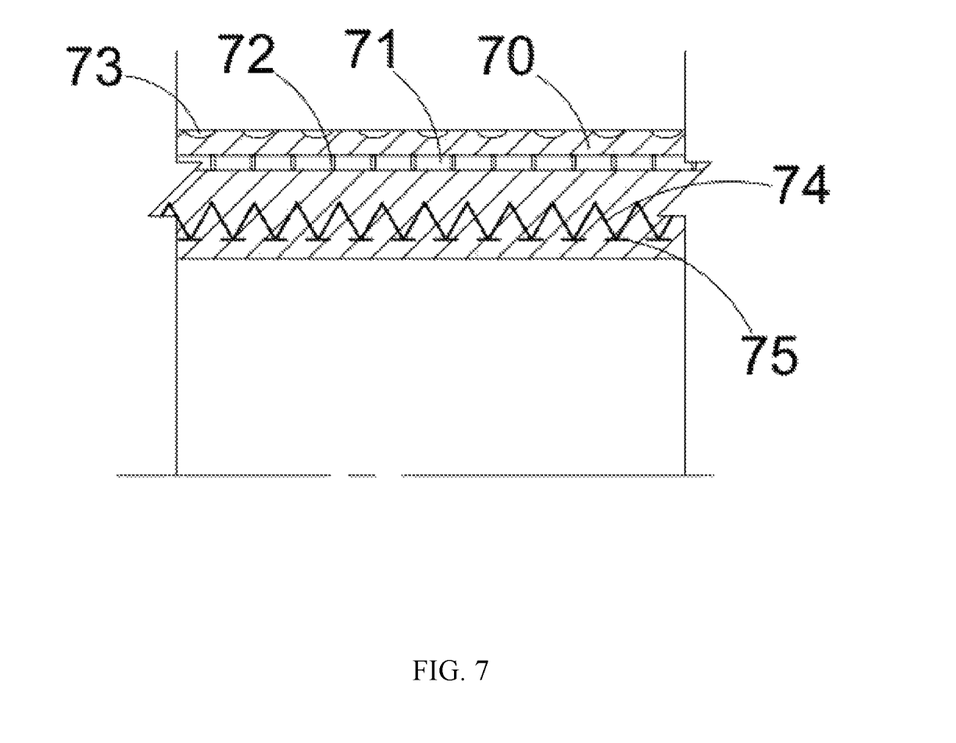
FIG. 7 is a sectional view of the sealing sleeve.

The sealing sleeve 70 is provided with sealed cavities 71 arranged at intervals; sealing supporting strips 72 are arranged in the sealing cavity 71; the upper end and the lower end of the sealing supporting strips 72 are respectively connected with the upper end wall and the lower end wall of the sealing cavity 71; an concave arc-shaped pressure bearing groove 73 is arranged on the outer side of the sealing sleeve 70; a bent first bearing pressing strip 74 is arranged in the sealing sleeve 70; the bending parts of the first bearing pressing strip 74 are connected with second bearing pressing strips 75. The purpose of the sealing sleeve 70 of the preferred embodiment is to solve the problem that the sealing sleeve 70 is broken and the contact hole exists between the sealing sleeve 70 and the contact surface of the core 80. The pressure bearing groove 73 provided on the surface of the sealing sleeve 70 can expand the acting area, thereby improving the effect of the external pressure on the sealing sleeve 70. The spacer sealing cavities 71 in the sealing sleeve 70 can solve the problem that the sealing sleeve 70 is broken due to excessive confining pressure, and some sealing cavities 71 can be fractured when the confining pressure is too large to avoid the whole fracture of the sealing sleeve 70. Sealing supporting strips 72 arranged in the sealing cavity 71 can improve the pressure bearing effect, and the sealing cavities 71 arranged at intervals can enable the external confining pressure to be uniformly distributed in the sealing cavities 71 before transmitted to the sealing sleeve 70 on the inner side, so that the inner wall of the sealing sleeve 70 is tightly connected with the surface of the core 80. This design makes the pressure equalization of both ends of the core 80 and ensures that the pressure difference between the confining pressure and the inlet section of the core 80 is stable, thereby preventing the core 80 pore structure from changing due to excessive pressure difference. In the process of the pressure acting on the sealing sleeve 70, the first pressure bearing pressing strip 74 can improve the overall strength of the sealing sleeve 70 to reduce the possibility of cracking, and meanwhile, the pressure can drive the second pressure bearing 75 pressing strip to press down to improve the contact tightness between the inner wall of the sealing sleeve 70 and the side wall of the core 80, thereby eliminating possible gaps.

Figure 8:
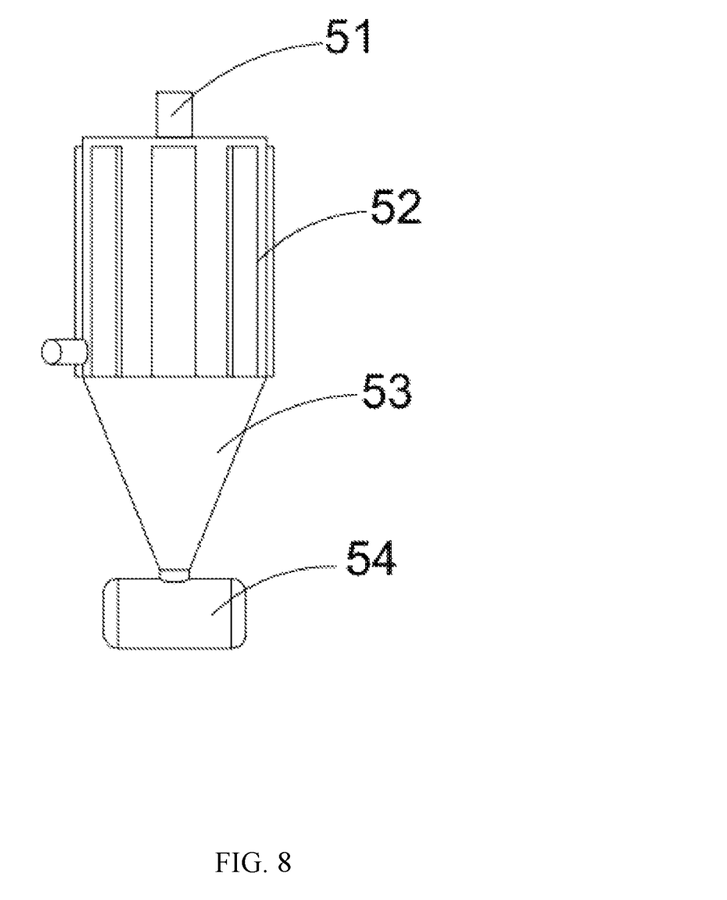
FIG. 8 is an external schematic diagram of the gas-liquid separator.
Figure 9:
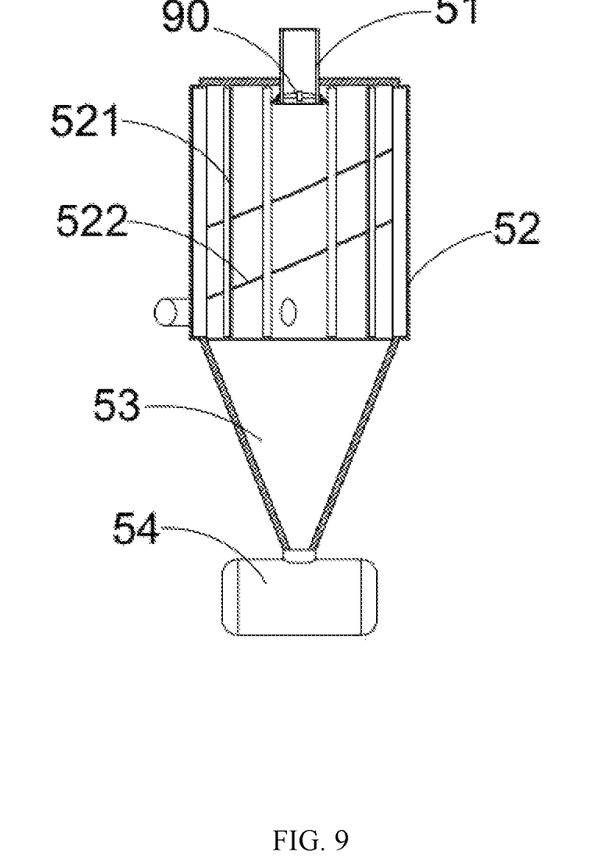
FIG. 9 is an internal schematic diagram of the gas-liquid separator.

The gas-liquid separator 50 comprises a cylindrical first separation substrate 52; the bottom end of the first separation substrate 52 is connected with a cone-shaped second separation substrate 53; the bottom of the second separation substrate 53 is connected with a liquid collecting tank 54; the upper part of the first separation substrate 52 is provided with a gas-liquid exhaust pipe 51, and the gas-liquid exhaust pipe 51 is connected with a gas meter 60. The medium from the core discharge end is subjected to gas-liquid separation by means of the gas-liquid separator 50. There may be a subsequent separation operation of the water-oil substances that may be present in the liquid. According to the preferred embodiment, the purpose of designing the cylindrical first separation substrate 52 is to enable the discharge medium to move along the inner wall of the first separation substrate, and the gas-liquid is separated by using centrifugal force and gravity; and the liquid is thrown out to the inner wall of the first separation substrate 52 under the action of gravity and centrifugal force. The second separation substrate plays an aggregation effect on the separated liquid, and increases the downward flowing speed, thereby avoiding the influence of the liquid on the gas-liquid separation process. The gas-liquid exhaust pipe 51 and the gas meter 60 are used for metering the acquired gas so as to obtain experimental data.

Figure 10:
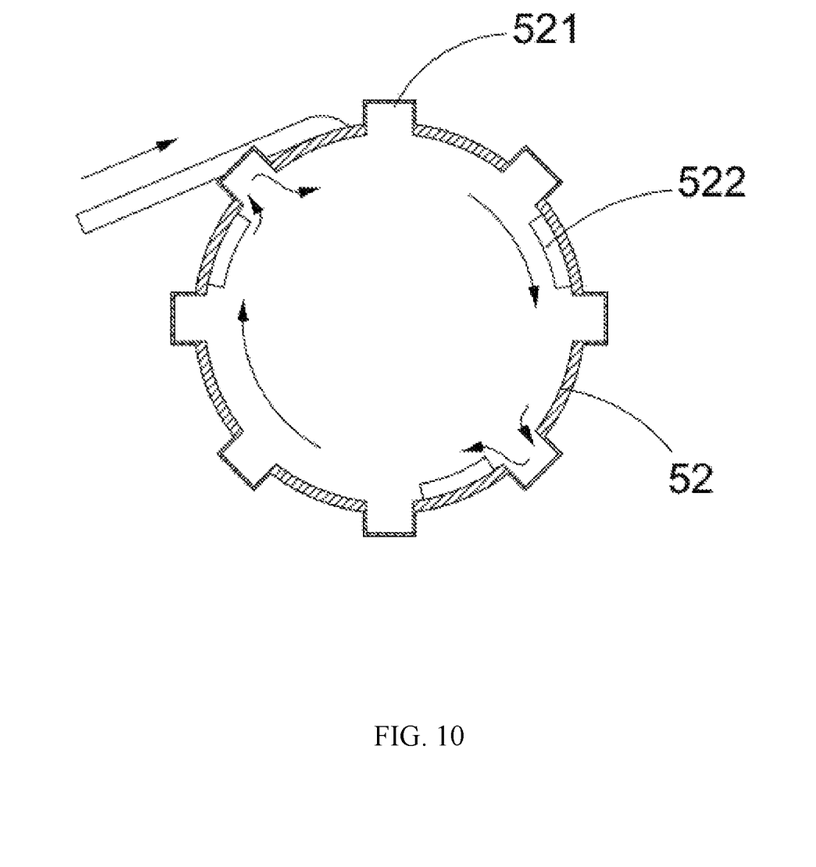
FIG. 10 is a top internal view of the first separation substrate.

The inner wall of the first separation substrate 52 is provided with separation cavities 521 protruding outwards around the inner wall of the first separation substrate; space among the separation cavities 521 of the inner wall of the first separation substrate 52 is spirally provided with flow guide plates 522. Designing the flow guide plate 522 on the inner wall of the first separation substrate 52 can promote the spiral rise of the separated gas; and increase the aggregation of the liquid that may be present in the gas flow in the spiral rise, thereby causing the aggregation of droplets in the gas to drop. The separation cavities 521 on the inner wall of the first separation substrate 52 can make it difficult for the liquid obtained by centrifugal separation to flow upward with the upwardly flowing gas after being thrown to the inner wall of the first separation base, thereby increasing the liquid falling rate. When passing through the cavities, even if the gas loses part of the flow rate, the gas can still flow upward under the action of the downward spirally rising gas, thereby expelling the first separation substrate.

Example 2

An experimental method for the experimental apparatus for an ultra-low permeability oil reservoir $CO_2$ displacement process, comprising the following steps:
1) After blow-drying the core with high pressure nitrogen at 110° C., two vacuum pumps are used to evacuate the core at both ends of the core; when the vacuum degree reaches 0.01 mmHg, evacuated for 36h, and then cooled to 70.6° C.
2) Saturated formation water was saturated at an experimental temperature of 70.6° C.; stable for 4h under experimental pressure (17/12 MPa), the saturated formation water volume was metered using a metering pump, this volume is the pore volume of the core.
3) Under the experimental temperature of 70.6° C., displacing the formation water with white oil such that the water in the core is in a bound state; the bound water saturation is 40.2%, and after the binding water is established, the core pressure rises to the experimental pressure of 17/12 MPa.
4) Under the experimental temperature of 70.6° C., the prepared formation crude oil is used for displacing white oil at a speed of 3.75 mL/h, and when the core effluent is consistent with the prepared formation original oil-gas oil ratio, it can be considered that the formation crude oil has been saturated.
5) $CO_2$ displacement after water displacement: water is injected into the core at a speed of 0.3 mL/h; when the water content of the core is up to 98%, and the pressure of the outlet end of the core rises to 17/12 MPa, $CO_2$ is injected into the core at a speed of 0.3 mL/L; the experiment ends when the oil displacement efficiency is not obviously increased.
6) Direct $CO_2$ displacement: when the pressure at the outlet end of the core is 17/12 MPa, the $CO_2$ is injected into the core at a speed of 0.3 mL/h; the experiment ends when the oil displacement efficiency is not obviously increased.
7) Periodic injection of $CO_2$: the pressure of the outlet end of the core is set to 17 MPa; when depletion mining to 7.1 MPa, $CO_2$ is injected to 17 MPa, and then the failure is depletion mined to 7.1 MPa; 5 cycles are performed; and finally, the oil is depletion mined to the normal pressure.
8) Sensitivity evaluation of the plug. The outlet end pressure is set to 17 MPa and 12 MPa, respectively; and the water flooding efficiency experiment is performed after injecting $CO_2$ slugs of 0.05 HCPV, 0.1 HCPV, 0.2 HCPV, 0.3 HCPV, 0.5 HCPV and 0.7 HCPV, respectively.
9) $CO_2$/water slug alternate injection: A total of 3 $CO_2$ slugs of 0.05 HCPV, 0.1 HCPV, and 0.3 HCPV are designed, and the gas-water ratio (all refer to the gas-water volume ratio under the experimental conditions) is 1:1, 1:2, and 2:1; and gas-water alternate cycle injection and flooding experiments under 17 MPa and 12 MPa.

By means of the experimental method, the method can be used for exploring what kind of injection mode can more effectively improve the recovery rate, and the problem that in the prior art, the experimental method for researching the $CO_2$ displacement process of the ultra-low permeability oil reservoir is lacking is solved. In addition, the above experimental method can provide a reference for the preferred and on-site implementation of the actual parameters.

Example 3

Figure 11:
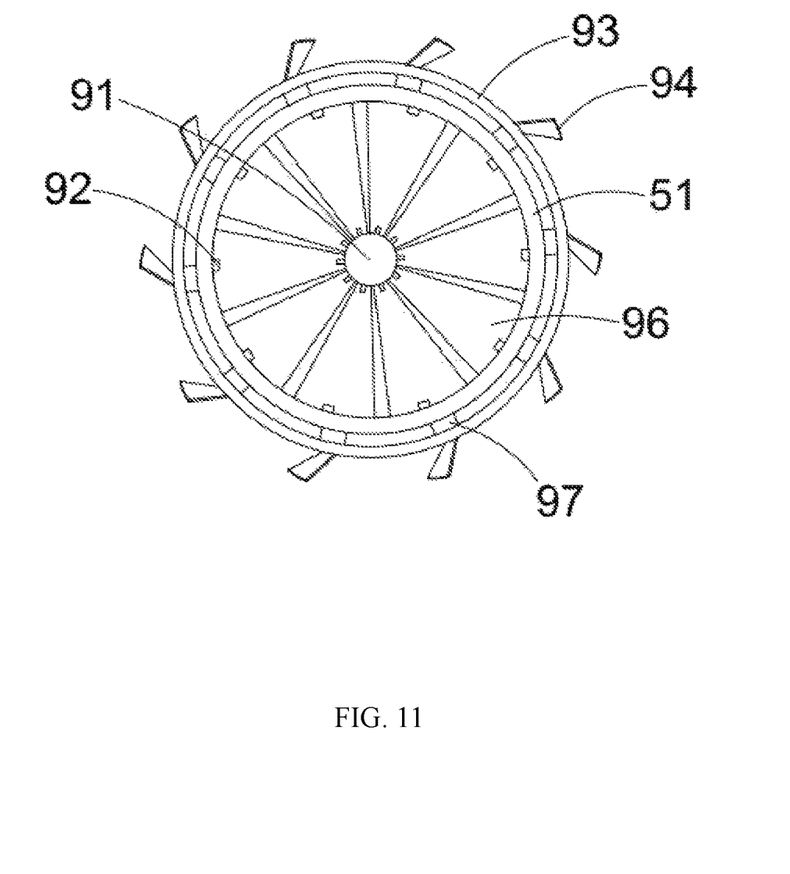
FIG. 11 is a top view of the exhaust assembly.
Figure 12:
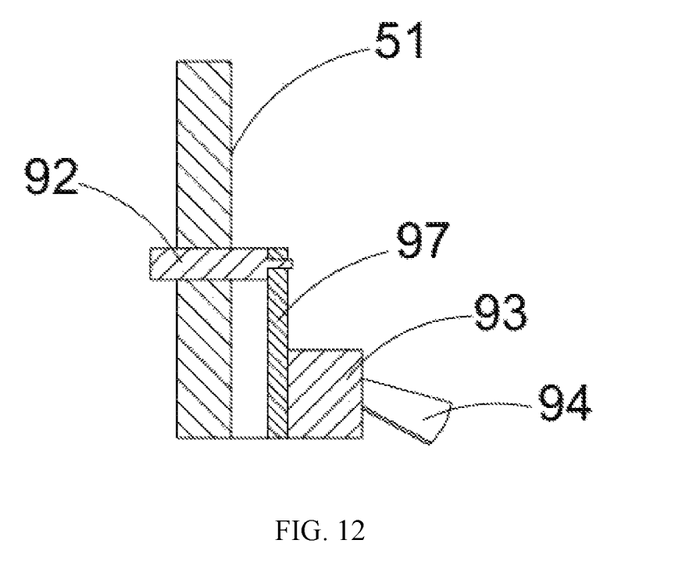
FIG. 12 is a schematic diagram of the connection between the rotating shaft and the rotating auxiliary rod.

This example is further improved on the basis of example 1:
Referring to FIG. 11-12,
An exhaust assembly 90 is disposed in the tube of the gas-liquid exhaust pipe 51; the exhaust assembly 90 includes a first exhaust substrate 91 disposed within the gas-liquid exhaust pipe 51; the first exhaust base 91 is columned and is coaxially arranged with the gas-liquid exhaust pipe 51; the side of the first substrate 91 is surrounded by second exhaust fans 96; one end of the second exhaust fan 96 is connected to the first exhaust substrate 91 by means of a rotating shaft 92, and the other end thereof is connected to the gas-liquid exhaust pipe 51 by means of a rotating shaft 92 and penetrates through the gas-liquid exhaust pipe 51; the rotating shaft 92 on the outer side of the gas-liquid exhaust pipe 51 is connected with a rotating auxiliary rod 97 perpendicular to the axis of the gas-liquid exhaust pipe 51; the bottom end of the rotating auxiliary rod 97 is connected to the exhaust rotating ring 93; the inner ring of the exhaust rotating ring 93 is fixedly connected to the rotating auxiliary rod 97; the exhaust rotating ring 93 is disposed in the first separating substrate 52; the outer side of the exhaust rotating ring 93 surrounds the first exhaust rotating blade 94 in the first separating substrate 52, the gas is discharged outwards through the gas-liquid exhaust pipe 51, and under the action of the upward airflow, the gas acts on the first exhaust rotating blade 94 to drive the exhaust rotating ring 93 to rotate; the rotating auxiliary rod 97 is driven to move in the rotating process of the exhaust rotating ring 93; in the moving process of the rotating auxiliary rod 97, the rotating shaft 92 can be driven to rotate, so that rotation of the second exhaust rotating blade 96 is achieved; and therefore, the exhaust channel is opened, and the circulation amount of the exhaust channel is regulated and controlled. Moreover, the gas passes through the second exhaust fan 96 to form an upward spiral flow discharge airflow, which is beneficial to rectification and fluid metering. In addition, based on the airflow pressure in the first separation matrix 52 and the rising flow rate, the first exhaust fan 94 can be automatically controlled to drive the rotation amount of the exhaust rotation ring 93, thereby achieving the self-regulation and control of the exhaust amount.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

We claim:

1. An experimental apparatus used for displacement of $CO_2$ within a reservoir, comprising:
   a displacement container comprising a water container (10), an oil container (12) and a gas container (11); and
   a core holder (30) respectively connected with the water container (10), the oil container (12) and the gas container (11) through a connecting pipe (20); and connected with a gas-liquid separator (50) through the connecting pipe (20);
   wherein, the core holder (30) comprises a sealing sleeve (70) sleeved outside a core (80); the core (80) is columnar and two opposite sides of the core (80) are respectively provided with a first plug (31) and a second plug (39); ends of the first plug (31) and the second plug (39) connected with the core (80) are located in the sealing sleeve (70); external sides of the first plug (31) and the second plug (39) are sealed and sleeved with a cylindrical clamping body (310); an outer diameter of the first plug (31) is matched with an inner wall of the clamping body (310); an outer side of the second plug (39) is sleeved with a stop ring (36) coaxial with the second plug (39), and an outer wall of the stop ring (36) is matched with the inner wall of the clamp body (310); two openings of the clamping body (310) are respectively provided with a first end cover (32) and a second end cover (37) for sealing; an outer wall of the sealing sleeve (70), the inner wall of the clamping body (310), a side wall of the stop ring (36) and a side wall of the first plug (31) formed a confining pressure cavity (34); a pressure source connector (3101) is provided on the clamping body (310) and in the middle of the confining pressure cavity (34); both ends of the confining pressure cavity (34) are respectively provided with a differential pressure joint (3102); the clamping body (310) is externally provided with a differential pressure meter (40), and the differential pressure meter (40) is connected to the differential pressure joint (3102).

2. The experimental apparatus of claim 1, wherein the first plug (31) is provided with a first hole (314) penetrating two ends of the first plug (31); an anti-corrosion pad (35) is provided between an end of the first plug (31) and the end of the core (80); the first hole (314) penetrates through the anti-corrosion pad (35) and the first plug (31);
   the second plug (39) is provided with a second hole (391) penetrating two ends of the second plug (39); the anti-corrosion pad (35) is provided between an end of the second plug (39) and the end of the core (80); the second hole (391) penetrates through the anti-corrosion pad (35) and the second plug (39).

3. The experimental apparatus of claim 2, wherein a first anti-movement component (33) is sleeved on the first plug (31) under the first end cover (32); the first anti-movement component (33) comprises an anti-movement sleeve (332) sleeved on an outer side of the first plug (31); anti-movement supporting strips (331) is arranged around a surface of the anti-movement sleeve (332); the anti-movement supporting strips (331) is connected to the inner wall of the clamping body (310).

4. The experimental apparatus of claim 3, wherein an inclined surface is provided on the first plug (31) next to the first anti-movement component (33); a first ring groove (312) is arranged around the-surface of the first plug (31) connected with the inner wall of the clamping body (310); a second sealing ring (313) is provided in the first annular groove (312); a sealing auxiliary member (311) is provided in a space formed by the first annular groove (312) and an inner wall surface of the clamping body (310); the sealing auxiliary members (311) extend into the first plug (31), and the sealing auxiliary members (311) in the first plug (31) are connected to each other; the sealing auxiliary members (311) consists of sealing strips.

5. The experimental apparatus of claim 1, wherein the sealing sleeve (70) is provided with sealed cavities (71) arranged at intervals; sealing supporting strips (72) is arranged in the sealing cavity (71); upper ends and lower ends of the sealing supporting strips (72) are respectively connected with an upper end wall and a lower end wall of the sealing cavity (71); a concave arc-shaped pressure bearing groove (73) is arranged on an outer side of the sealing sleeve (70); a bent first bearing pressing strip (74) is arranged in the sealing sleeve (70); bending parts of the first bearing pressing strip (74) are connected with second bearing pressing strips (75).

6. The experimental apparatus of claim 5, wherein the gas-liquid separator (50) comprises a cylindrical first separation substrate (52); a bottom end of the first separation substrate (52) is connected with a cone-shaped second separation substrate (53); a bottom of the second separation substrate (53) is connected with a liquid collecting tank (54); an upper part of the first separation substrate (52) is provided with a gas-liquid exhaust pipe (51), and the gas-liquid exhaust pipe (51) is connected with a gas meter (60).

7. The experimental apparatus of claim 6, wherein an inner wall of the first separation substrate (52) is provided with separation cavities (521) protruding outwards around the inner wall of the first separation substrate (52); space among the separation cavities (521) of the inner wall of the first separation substrate (52) is spirally provided with flow guide plates (522).

8. An experimental method used for displacement of $CO_2$ within the reservoir using the experimental apparatus of claim 1, comprising the following steps:
   blow-drying the core, vacuuming the core and measuring a pore volume of the core;
   displacing formation water with white oil such that water in the core being in a bound state; displacing the white oil with formulated formation crude oil; wherein the formation crude oil being saturated when an oil-gas ratio of core effluent being consistent with an oil-gas ratio of formulated formation crude oil;
   performing $CO_2$ flooding after water flooding, direct $CO_2$ flooding, and periodic injection of $CO_2$ respectively; and
   performing sensitivity evaluation of the plug.

9. The experimental method of claim 8, wherein a saturation of bound water is 40.2%.

* * * * *